(12) United States Patent
Allgaier et al.

(10) Patent No.: US 9,037,330 B2
(45) Date of Patent: May 19, 2015

(54) METHOD AND SYSTEM FOR OPERATING A HYBRID VEHICLE

(71) Applicant: ZF Friedrichshafen AG, Friedrichshafen (DE)

(72) Inventors: Bernd Allgaier, Kressbronn (DE); Michael Gromus, Eriskirch (DE); Friedrich Tenbrock, Langenargen (DE); Thomas Lemp, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/862,146

(22) Filed: Apr. 12, 2013

(65) Prior Publication Data

US 2013/0274979 A1     Oct. 17, 2013

(30) Foreign Application Priority Data

Apr. 16, 2012  (DE) .......................... 10 2012 206 158

(51) Int. Cl.
*B60W 10/02*  (2006.01)
*B60W 10/06*  (2006.01)
*B60W 20/00*  (2006.01)
*B60W 10/08*  (2006.01)
*B60K 6/48*   (2007.10)

(52) U.S. Cl.
CPC ............... *B60W 20/40* (2013.01); *B60W 10/02* (2013.01); *B60W 10/06* (2013.01); *B60W 10/08* (2013.01); *B60W 2600/00* (2013.01); *Y10S 903/93* (2013.01); *Y02T 10/6286* (2013.01); *B60K 6/48* (2013.01); *B60K 2006/4825* (2013.01); *B60W2710/027* (2013.01); *B60W 2710/0627* (2013.01); *Y02T 10/6221* (2013.01); *Y02T 10/6252* (2013.01); *Y02T 10/48* (2013.01)

(58) Field of Classification Search
CPC ..... B60W 20/40; B60W 10/06; B60W 10/02; B60W 10/08; B60W 2600/00; Y10S 903/93
USPC .......................... 701/22; 180/65.265; 903/930
See application file for complete search history.

(56) References Cited

U.S. PATENT DOCUMENTS 5,993,351 A     11/1999  Deguchi et al.
2003/0042098 A1*  3/2003  Takeuchi et al. ............. 192/3.29
(Continued)

FOREIGN PATENT DOCUMENTS

DE    10 2008 002 382 A1    12/2009

OTHER PUBLICATIONS

Search Report dated Mar. 14, 2013 for German Application No. 10 2012 206 158.4, including Translation of Section C, 7 pages.

*Primary Examiner* — Yonel Beaulieu
*Assistant Examiner* — Martin Weeks
(74) *Attorney, Agent, or Firm* — Brinks Gilson & Lione

(57) ABSTRACT

A method for operating a hybrid vehicle comprises conducting unfire operation in an internal-combustion engine in a fuel cut-off mode during a hybrid-mode ride in deceleration of the internal-combustion engine, disconnecting the internal-combustion engine from an output while maintaining the fuel cut-off mode, and reducing a transmission capacity of a clutch configured to couple the internal-combustion engine and an electric motor. During a hybrid-mode ride in deceleration of the internal-combustion engine for transition to the purely electric drive, the internal-combustion engine may be disconnected from the output and shut down. When the internal-combustion engine is operated unfired in a fuel cut-off mode, the internal-combustion engine may be disconnected from the output and shut down by reducing the transmission capacity of the clutch that is connected between the internal-combustion engine and the electric motor.

8 Claims, 1 Drawing Sheet

(56) References Cited

U.S. PATENT DOCUMENTS

| | | | |
|---|---|---|---|
| 2007/0102207 A1* | 5/2007 | Yamanaka et al. | 180/65.3 |
| 2007/0278022 A1 | 12/2007 | Tanishima | |
| 2008/0106227 A1* | 5/2008 | Gebert et al. | 318/371 |
| 2009/0312143 A1* | 12/2009 | Allgaier et al. | 477/5 |
| 2012/0109473 A1* | 5/2012 | Hodrus et al. | 701/51 |
| 2012/0130579 A1* | 5/2012 | Steuernagel et al. | 701/22 |

* cited by examiner

METHOD AND SYSTEM FOR OPERATING A HYBRID VEHICLE

PRIORITY STATEMENT

This application claims the benefit of Germany Patent Application DE 10 2012 206 158.4, filed Apr. 16, 2012, and incorporates the Germany Patent Application by reference herein in its entirety.

BACKGROUND

Motor vehicles are increasingly designed as hybrid vehicles, whose drive unit is provided by a hybrid drive. The drive unit comprises an internal-combustion engine and, in addition, an electric motor. A transmission is placed between the hybrid drive of hybrid vehicle and its driven gear. The operation of the transmission is controlled and/or regulated by a transmission control device. The operation of the electric motor is controlled and/or regulated by a hybrid control device. The operation of the internal-combustion engine is controlled and/or regulated by an engine control device.

When a motor vehicle is operating under a hybrid-mode ride, the drive torque is provided both by the internal-combustion engine and the electric motor of the hybrid drive at the output of the hybrid vehicle. At a purely electric ride, the internal-combustion engine of the hybrid drive is disconnected from the output and preferably stopped. If a change from the hybrid-mode ride into a purely electric ride occurs in a deceleration fuel cut-off of the internal-combustion engine of the hybrid drive, the internal-combustion engine in deceleration fuel cut-off is disconnected from the drive and stopped, wherein in hybrid vehicles known in practice this is done so that the internal-combustion engine operated in the deceleration fuel cut-off operation increases its torque over a predetermined course to approximately zero, and then a clutch interposed between the internal-combustion engine and the electric motor is opened in order to decouple the internal-combustion from the output. A disadvantage here is that in order to increase the torque of the internal-combustion engine, the engine is fired and then needs the same fuel accordingly.

SUMMARY

In one aspect, when the internal-combustion engine is operating unfired in deceleration fuel cut-off, the internal-combustion engine, while maintaining the deceleration fuel cut-off, may be uncoupled from the output and stopped by lowering a transmission capacity of the transmission interposed between the internal-combustion engine and the electric motor.

In one aspect, during a change from a hybrid-mode ride into a purely electric ride, systems and methods of the present application may uncouple the internal-combustion engine of the hybrid drive in deceleration fuel cut-off by a clutch between the internal-combustion engine of the hybrid drive and the electric motor of the hybrid drive, namely the systems and methods of the present application may uncouple the internal-combustion engine by reducing the transmission capacity of the clutch interposed between the internal-combustion engine and the electric motor, wherein the deceleration fuel cut-off mode for the combustion engine remains active. Accordingly, to uncouple and stop the internal-combustion engine, the engine may not be fired and, accordingly, no fuel needs to be introduced into it.

In one aspect, when the clutch is in closed position, the transmission capacity of the clutch may be greater than a drag torque of the internal-combustion engine in the deceleration fuel cut-off mode, the clutch that is interposed between the internal-combustion engine and the electric motor may be opened in a defined process and thus may reduce the transmission capacity. While reducing the transmission capacity, when the transmission capacity of the clutch electric motor equals the drag torque of the internal-combustion engine in the deceleration fuel cut-off mode, the systems of the present application may further reduce the transmission capacity of the clutch, and the torque provided by the electric motor at the output may be so adjusted that the total torque produced by the internal-combustion engine and the electric motor may equal to a torque desired by the driver. The above procedure may allow a particularly preferred decoupling and stopping of the internal-combustion engine of the hybrid drive in the deceleration fuel cut-off mode.

In one respect, from a time at which the transmission capacity of the clutch electric motor becomes equal to the drag torque of the internal-combustion engine in the deceleration fuel cut-off mode, the transmission capacity of the clutch may be reduced in individual stages or reduced linearly to zero, and the torque provided by the electric motor at the output may be adjusted in such a manner that the total torque provided at the output by the internal-combustion engine and the electric motor remains approximately constant.

BRIEF DESCRIPTION OF THE DRAWINGS

The exemplary systems and methods described below may be more fully understood by reading the following description in conjunction with the drawings, in which.

The exemplary systems and methods as described herein may take a number of different forms. Not all of the depicted components may be required and some implementations may include additional, different, or fewer components from those expressly described in this disclosure. Variations in the arrangement and type of the components may be made without departing from the spirit or scope of the claims as set forth herein

DETAILED DESCRIPTION OF EXAMPLE EMBODIMENTS

Figure 1:
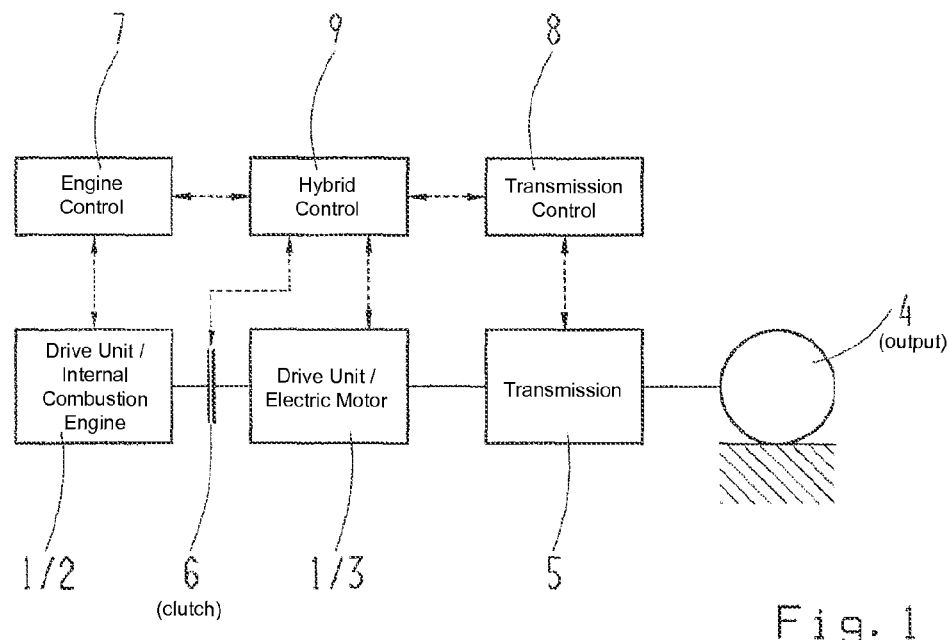
FIG. 1 illustrates an exemplary diagram of a drive train of a hybrid vehicles.

FIG. 1 illustrates an exemplary diagram of a drive train of a hybrid vehicle. The hybrid vehicle may comprise a drive unit 1 designed as a hybrid drive. The hybrid drive may comprise an internal-combustion engine 2 and an electric motor 3. A transmission 5 may be connected between the drive unit 1 and an output 4 of the hybrid vehicle.

A clutch 6 may connect the internal-combustion engine 2 and the electric motor 3 of the hybrid drive 1, wherein when the clutch 6 is open, the internal-combustion engine 2 is uncoupled from the rest of the drive train, and wherein when the clutch 6 is closed, the internal-combustion engine 2 is coupled to the drive train.

The hybrid vehicle comprises a control system, which comprises a motor control device 7 to control and/or regulate the operation of at least the internal-combustion engine 2 of the hybrid drive system 1. The control system may also comprise a transmission control device 8 for controlling and/ regulation of the operation of at least the transmission 5. The control system further may comprise a hybrid control device 9 for controlling and/or regulation of the operation of at least the electric motor 3 of the hybrid drive 1.

According to FIG. 1, the engine control unit 7 may exchange data with the internal-combustion engine 2, the transmission control device 8 exchanges data with the transmission 5, and the hybrid control device 9 may exchange data with the electric motor 3. The above control devices 7, 8, 9 may generate control signals for controlling and/or regulating the operation of the internal-combustion engine 2, the electric motor 3, and the transmission 5.

In FIG. 1, the motor control device 7 may exchange data with the hybrid control device 9 and the hybrid control device 9 may exchange data with the transmission control device 8.

According to FIG. 1, the hybrid control device 9 may also exchange data with the clutch 6 connected between the internal-combustion engine 2 and the electric motor 3.

The hybrid drive 1 or the hybrid vehicle may be operated in a hybrid mode, wherein during the hybrid-mode ride both the internal-combustion engine 2 and the electric motor 3 may provide a drive torque at the output 4. In the purely electric ride, the internal-combustion engine 2 may be disengaged from the output 4, e.g. by opening of the clutch 6, in which case only the electric motor 3 provides a drive torque at the output 4.

The present invention relates to a change from a hybrid-mode ride to a pure electric ride with an internal-combustion engine 2 in a deceleration fuel cut-off mode, wherein for this purpose the internal-combustion engine 2 may be disconnected from the output and shut down.

According to example embodiments of this application, when the internal-combustion engine 2 is operated unfired in a fuel cut-off mode, the internal-combustion engine 2 may be disconnected from the output 4 and then ceases its operation, while maintaining the fuel cut-off, by reducing the transmission capacity of the clutch 6 connected between the internal-combustion engine 2 and the electric motor 3.

For this purpose, the hybrid control device 9 may generate corresponding control signals for the electric motor 3 and the clutch 6 that is connected between the electric motor 3 and the internal-combustion engine 2.

Figure 2:
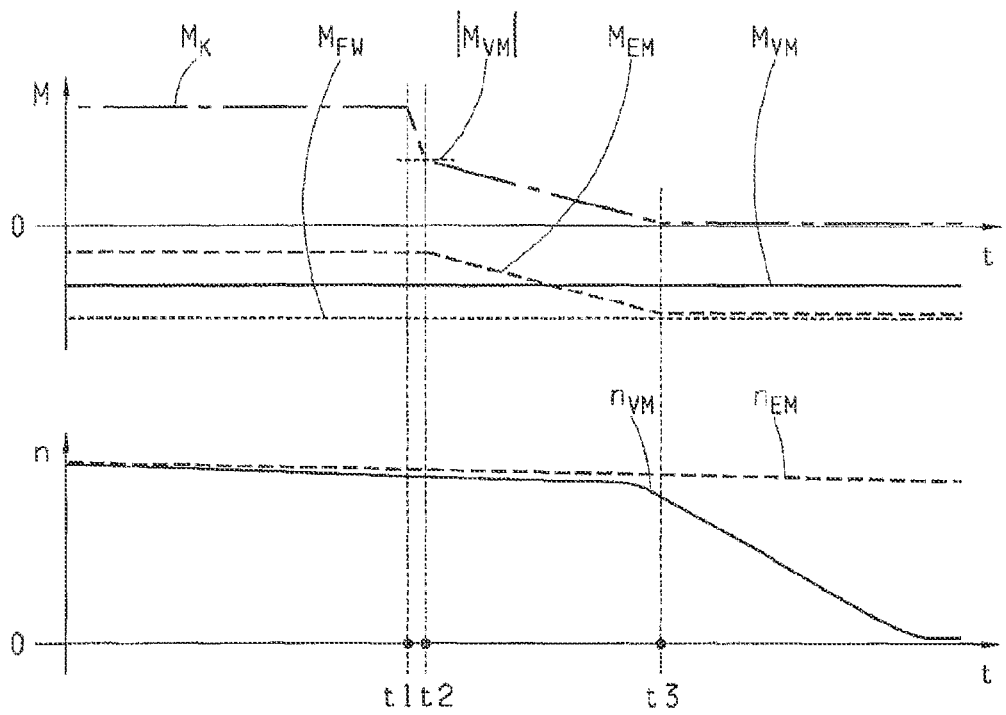
FIG. 2 is a diagram illustrating a method for decoupling an internal-combustion engine from a hybrid drive, according to an example embodiment of the present application.

FIG. 2 is a diagram illustrating a method for decoupling an internal-combustion engine from a hybrid drive, according to an example embodiment of the present application. FIG. 2 shows different curves of torques M and different curves of speeds n as a function of time t. Thus, FIG. 2 shows a torque curve of a driver-desired torque $M_{FW}$, a torque curve $M_{EM}$ of a torque provided by the electric motor 3, a torque curve $_{MVM}$ of the torque of the internal-combustion engine 2, and a torque curve $M_K$, for the clutch 6. Furthermore, a rotational speed curve $n_{VM}$ of the internal-combustion engine 2 and a rotational speed curve $n_{EM}$ of the electric motor 3 are shown.

Before time $t_1$, the hybrid vehicle or the hybrid drive 1 may be operated in the hybrid mode, wherein a driver-desired torque $M_{FW}$, may be negative, and said driver-desired torque $M_{FW}$, may be provided with a fully closed clutch 6 by the internal-combustion engine 2 and the electric motor 3 together. The internal-combustion engine 2 may be operated unfired in fuel cut-off mode so that the torque $M_{VM}$ equals the drag torque $M_{VM}$ of the internal-combustion engine 2.

The torque $M_K$ is the torque that may be transmitted by the clutch 6, wherein prior to time t1 the clutch 6 may be fully closed, and wherein before time t1 the torque $M_K$ transmissible by the clutch 6 may be greater than the modulus $|M_{VM}|$ of the drag torque $M_{VM}$ of the internal-combustion engine 2 of the hybrid drive 1.

Beginning at time t1, a change from the hybrid-mode ride to the purely electric ride may occur, wherein for this purpose at time t1, the transmission capacity of the clutch 6 that is connected between the internal-combustion engine 2 and the electric motor 3 may be reduced by decreasing the moment $M_K$, wherein at time t2, the torque $M_K$ transmittable by the clutch 6 may be equal to the modulus $|M_{VM}|$ of the drag torque $M_{VM}$ of the internal-combustion engine 2. From time t2, the transmission capacity of the clutch 6 that is connected between the internal-combustion engine 2 and the electric motor 3 may further be reduced, e.g. the transmission capacity of the clutch 6 may be reduced linearly or in stages, until at time t3 the torque transmissible by the clutch torque is zero so that at time t3 the clutch 6 may be fully open.

At the time t2, the transmission capacity of the clutch 6 is the amount $|M_{VM}|$, which may correspond to the drag torques of the engine 2. Accordingly, the amount of the clutch moment $M_K$ may correspond to the amount of drag torques $M_{VM}$ of the engine 2, and may be parallel to or respond simultaneously to the reduction of the transmission capacity of the clutch 6 electric motor. Clutch 6 and/or the transmission capacity of clutch 6 may be adjusted to coordinate with the moment $M_{EM}$ provided by the electric motor 3 at the output 4 such that the internal-combustion engine 2 and the electric motor 3 may provide a total moment corresponding to the driver input torque $M_{FW}$, so that on the output drive 4 the total moment provided from the internal-combustion engine 2 and the electric motor 3 together may remain electric motor roughly constant and unchanged.

The change from a hybrid-mode ride to an electric-mode ride by disconnecting and stopping the internal-combustion engine 2 in deceleration with the internal-combustion engine 2 in fuel cutoff mode may not affect the output 4. In this respect, a more convenient change from the hybrid-mode ride to the purely electric drive may be ensured, wherein during the entire process, the fuel cut-off is maintained for the combustion engine 2 so that therefore, during the entire process the internal-combustion engine 2 is not fired and thus no fuel is introduced into it.

REFERENCE NUMBERS

1 Drive unit
2 Internal-combustion engine
3 Electric motor
4 Output
5 Transmission
6 Clutch
7 Engine control device
8 Transmission control device
9 Hybrid control device

The invention claimed is:

1. A method for disconnecting an internal-combustion engine from an output, the method comprising:
   conducting an unfire operation in an internal-combustion engine in a fuel cut-off mode during deceleration of the internal-combustion engine in a hybrid-mode ride; and
   reducing a transmission capacity of a clutch in a predetermined manner, wherein the clutch is located between the internal-combustion engine and an electric motor and is configured to couple and decouple the internal combustion engine from the electric motor, wherein the electric motor is connected to the output through a transmission, wherein reducing the transmission capacity of the clutch in the predetermined manner comprises:

when the transmission capacity of the clutch is initially greater than a drag torque of the internal combustion engine in the fuel cutoff mode, reducing the transmission capacity of the clutch until the transmission capacity of the clutch equals the drag torque of the internal-combustion engine in the fuel cut-off mode; and after the transmission capacity of the clutch equals the drag torque of the internal-combustion engine in the fuel cut-off mode, further reducing the transmission capacity of the clutch while also lowering a torque provided by the electric motor such that a total torque provided at the output equals a target torque value.

2. The method of claim 1, wherein while reducing the transmission capacity of the clutch in the predetermined manner, the method further comprises maintaining the total torque at a constant value.

3. The method of claim 1, wherein further reducing the transmission capacity comprises further reducing the transmission capacity in a ramp function or in a linear manner until the transmission capacity equals zero.

4. The method of claim 1, wherein the total torque is the sum of the torque provided by the electric motor and the drag torque of the internal combustion engine provided through the clutch.

5. A control device of a hybrid vehicle comprising:
a hybrid drive with a clutch between an internal-combustion engine and an electric motor, wherein the clutch is configured to couple and decouple the internal-combustion engine and the electric motor;
a transmission configured to couple the hybrid drive and an output; and
a controller configured to:
generate a first signal to operate the internal-combustion engine unfired in deceleration and in a fuel cut-off mode;
when the transmission capacity of the clutch is greater than a drag torque of the internal-combustion engine in a fuel cut-off mode, generate a second signal to reduce a transmission capacity of the clutch;
generate a third signal to shut down the internal-combustion engine;
when the transmission capacity of the clutch equals a drag torque of the internal-combustion engine in a fuel cut-off mode, generate a fourth signal to further reduce the transmission capacity of the clutch in a predetermined manner; and
generate a fifth signal to adjust a torque provided by the electric motor so that a total torque provided at the output equals a target torque.

6. The control device of claim 5, wherein the target torque is constant.

7. The control device of claim 5,
wherein the fourth signal is to reduce the transmission capacity of the clutch in a ramp function or in a linear manner from when the transmission capacity of the clutch is equal to the drag torque of the internal-combustion engine in the fuel cut-off mode until the transmission capacity is zero.

8. The control device of claim 5, wherein the third signal to shut down the internal-combustion engine is generated when the transmission capacity of the clutch is equal to zero.

\* \* \* \* \*